United States Patent Office 3,582,312
Patented June 1, 1971

---

3,582,312
MICRONUTRIENT FERTILIZER AND METHOD FOR ITS PREPARATION
Howard V. Hess, Glenham, and Edward L. Cole, Fishkill, N.Y. (both of Texaco Inc., P.O. Box 509, Beacon, N.Y. 12508)
No Drawing. Continuation-in-part of application Ser. No. 611,233, Jan. 24, 1967. This application Mar. 27, 1970, Ser. No. 23,501
Int. Cl. C05f 11/00
U.S. Cl. 71—27    7 Claims

ABSTRACT OF THE DISCLOSURE

Process for preparing cation exchanged derivatives of sulfonated petroleum coke or the alkali metal salts thereof, useful as micronutrient fertilizer, soil conditioner, or as ion exchange material. Petroleum coke is sulfonated at a temperature in the range of about 150 to 250° F., washed, and contacted with dilute aqueous solutions containing a cation from the group consisting of copper, iron, magnesium, molybdenum, manganese, zinc, cobalt, ammonium and mixtures thereof.

---

This application is a continuation-in-part of our application Ser. No. 611,233, filed Jan. 24, 1967 and now abandoned.

BACKGROUND OF THE INVENTION

Field of the invention

This invention relates to the process for preparing cation exchanged derivatives of sulfonated petroleum coke or the alkali metal salts thereof.

Description of the prior art

Soil for rapidly growing high yield crops may require fertilization or structural improvement or both depending upon the specific crop or soil. Commercially available inorganic fertilizers generally provide only the so-called primary elements—nitrogen, phosphorus, and potassium, or the secondary elements—calcium, magnesium, and sulfur. Being water-soluble, such fertilizers are easily leached from the soil; and, they do little to improve the soil tilth. Furthermore, they must be supplemented with organic fertilizer and certain trace elements such as copper, iron, manganese, zinc, cobalt, molybdenum, and boron. These trace elements are called micronutrients because of the relatively small amounts required by plants for healthy growth. Organic fertilizers are necessary as a source of food for energy, growth, and reproduction of soil microorganisms.

When a soil is deficient in any micronutrient, crop yields are bound to suffer. The supply of nutrients in the soil is affected by the parent material from which the soil was derived, along with such things as erosion, leveling, leaching, and removal of trace elements through crop yields. Soil types characterized by micronutrient shortages and inferior structure include sand, muck, and peat. The difference between trace element deficiency and toxicity is but a few parts per million as measured by the concentration of the element in the soil solution. Therein lies the difficulty with trace element nurition. Over-fertilization with commercial fertilizers to provide a reserve of water-soluble micronutrients may also burn the crop. For example, 0.4 pound of copper, .10 pound of zinc, and .76 pound of manganese are all that may be necessary to support the healthy growth of 3,000 pounds of tobacco.

Synthetic ion exchange resins having a polymeric skeleton such as phenol-formaldehyde, polystyrene, polyolefins, and olefin-maleic anhydride compounds have been previously suggested for use in potting soil compositions. However, because of the high cost of synthetic ion exchange resins and the large amount necessary per acre, it is impractical to use such materials for fertilizing and improving soil tilth on a large-scale. Further these resinous materials lack heat resistance, mechanical strength, and fail to provide a plurality of micronutrient cations on the same matrix. Similarly, sulfonated coal having a high content of combined oxygen (greater than 10 wt. percent) and ash is a poor soil conditioner because it cakes when wet and powders when dry. In addition, sulfonated coal burns readily and is subject to spontaneous combustion. Further sulfonated coal does not provide the soil with micronutrient cations.

Ion-exchange gel-like materials for softening water have been previously suggested as being formed by heating sulfuric acid with the residual acid tar or sludge from refining mineral oil at a temperature in the range of 320 to 392° F. (160–200° C.). Above 392° F. such materials tend to break up into extremely fine, water soluble powder. These materials contain sulfur cross-linkages and the following typical analysis in weight percent: fixed carbon 70%, volatiles 29%, and acid 1%. Further they do not provide the soil with micronutrient cations.

From the aforesaid, it is obvious that the prior art materials are substantially different from the class of cationic derivatives of sulfonated petroleum coke defined by the subject invention. Further, the prior art materials are costly to produce, mechanically weak, and lack heat resistance.

SUMMARY

Single and multi-cation exchanged derivatives of sulfonated petroleum coke useful as micronutrient fertilizer, soil conditioner, or ion exchange material are made by the following process. About one part by weight of finely divided petroleum coke, such as preferably made by the delayed coking process and being substantially free of combined oxygen, is contacted with about 0.5 to 7 parts by weight of a sulfonating agent, such as 96 to 100% $H_2SO_4$ or 20 to 50% oleum at a temperature of about 150° F. to about 250° F. for about two hours. The sulfonated petroleum coke precursor which is thereby produced contains attached sulfo and carboxy groups but substantially no sulfur cross-linkages. Further, it is hard, black, mechanically strong, heat resistant, insoluble in water, and will not burn.

The sulfonated petroleum coke precursor is washed with portions of dilute HCl and deionized water until free of sulfate ions. The washed sulfonated petroleum coke or the alkali metal salt thereof is then contacted at room temperature with at least one dilute aqueous solution containing at least one cation from the group of cations consisting of copper, iron, magnesium, molybdenum, manganese, zinc, cobalt, ammonium or mixtures thereof. The concentration of each cation in solution is about 0.001 to 5 moles per liter. Ion-exchange takes place between said cations and hydrogen ions from the sulfo and carboxyl groups which are attached to the petroleum coke matrix. Heavy metal cations are thereby chemically combined with the sulfonated petroleum coke precursor in amounts of about 0.01 to 5 weight percent for each cation exchanged.

It is therefore a principal object of the present invention to provide a simple process for producing single and multi-cation exchanged derivatives of sulfonated petroleum coke.

Another object of this invention is to produce a combination soil conditioner and micronutrient fertilizer from low cost petroleum coke.

Still another object of this invention is to produce a low cost heat resistant mechanically strong ion-exchange material from low cost readily available petroleum coke.

DESCRIPTION OF THE INVENTION

By the process of the present invention improved, novel, low cost micronutrient fertilizers may be produced. These new micronutrient fertilizers are water-stable and slowly ionize or react in the soil to release trace elements which are vital to plant life. In addition, they may be used to improve the structure of poor soils. When added to the soil they improve soil aggregation, porosity, air permeability, water infiltration, and soil tilth. Furthermore, they help to prevent soil crusting and compaction; and may be used as a plant mulch. As a source of energy for microbiological activity they will increase the development of bacteria, fungus, and other microorganisms in the soil. Such microorganisms are active in soil processes and are essential to healthy plant growth. They excrete enzymes that decompose plant residue and organic matter, oxidize ammonia, fix nitrogen, digest protein, and synthesize new organic compounds. The new micronutrient fertilizer also provides a marked buffering effect by reducing damage to plant roots from excessive acids, alkalis, or salts in the soil. Finally, the product of this invention is useful as a low cost heat resistant ion-exchange material in such applications as hydroponics or soil-less agriculture.

In the process of the present invention, sulfonated petroleum coke is produced as an intermediary compound by reacting petroleum coke with a sulfonating agent such as 96–100% sulfuric acid or 20–50% oleum, with or without a promoter. In one embodiment, the sulfonated petroleum coke is treated with an aqueous solution containing the desired cation to form the cation exchanged derivative. This reaction may be illustrated by the following equation:

2 (petroleum coke—$SO_3H$) +$Me^{++}A^{--}$→

(petroleum coke—$SO_3)_2Me + H_2^+A^{--}$ where: $Me^{++}$ represents a cation and $A^{--}$ represents an anion. Micronutrient cations are attached to sulfonated petroleum coke by replacing the hydrogen ion in chemically attached sulfo and carboxyl groups.

In a similar manner, additional nitrogen may be added to the petroleum coke by treating the sulfonated petroleum coke precursor with a dilute aqueous solution of ammonium hydroxide or ammonium chloride. Furthermore, a multi-ion exchange material may be prepared by treating sulfonated petroleum coke in successive steps with different cation solutions, or in one step with a solution containing mixed cations. By controlling the type and quantity of ions added to the sulfonated coke, ion exchange materials may be prepared which will release in the soil controlled amounts of specific micronutrients over long periods of time. This prevents dangerously high dosages of trace elements which might otherwise burn the crop. Furthermore, rain will not leach these cation derivatives of sulfonated petroleum coke from the soil. Various cation exchange materials prepared by this process may be blended to meet the nutrient requirements for a specific crop on a specific soil, or for pH control.

The black body character of cation derivatives of sulfonated petroleum coke increases the absorptivity of the soil for solar radiation by as much as 40 percent, and makes possible a ground temperature increase of 10–20° F. Carbon in cationic petroleum coke may be utilized by heterotrophic and autotrophic microorganisms in the soil as a source of energy for biochemical transformations. In addition, the trace elements supplied by the cationic coke favorably influence catalytic effects within the cell, cell membrane structure and permeability, and other phases of the physiology of bacteria. Heterotrophics include both gram negative and gram positive bacteria as well as sporeformers and many fungi and actinomycetes. The two autotrophic genera generally prominent in soil nitrification are Nitrosomonas and Nitrobacter. The former function as ammonia oxidizers and the latter as nitrite oxidizers.

By means of ion exchange reactions in the soil, the cations of cationic derivatives of sulfonated petroleum coke are released for absorption by either microorganisms or plants during their metabolic processes. The exchangeable cations may pass into the soil through exchange with hydrogen ions from dilute acids formed in the soil by biological processes or introduced as constituents of rain water or commercial fertilizer. Furthermore, the exchangeable cations may be replaced by other cations already in the soil in accordance with the lyotropic series which follows in order of replacing power: lithium<

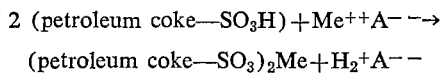

<strontium<barium<aluminum.

In another theory, it is postulated that metal petroleum coke sulfonate particles directly contacting plant root surfaces exchange petroleum coke cations for the hydrogen ions that are part of the protein in the plant root. Thus, the petroleum coke cations are directly absorbed by the plant root without passing through an intermediate solution stage.

The petroleum coke used as a starting material in the process of this invention may be preferably obtained as a by-product from the "delayed coking" process—a special process in which heavy residual fuel oil is converted into gasoline and gas oil. Petroleum coke is abundant, relatively cheap, and in the past was considered a waste product and a nuisance. Other petroleum coking processes may be used if they produce petroleum coke having a similar composition. There is no chemical formula for petroleum coke. It has a graphite-like uniform unsubdivided matrix of considerable physical extent formed from dehydrogenated and condensed hydrocarbons of high molecular weight. Dispersed throughout the petroleum coke matrix is a relatively small amount of highly condensed petroleum based aromatic-like compounds whose exact composition is unknown. Petroleum coke has the following typical composition by weight: moisture 0–.25%, volatiles 4–7%, fixed carbon 92–96%, ash 0.2–1.3%, and sulfur 1.0–5%. Its bulk density varies from about 57 to 70 pounds per cubic foot, and its heat resistance is greater than 900° F.

Petroleum coke is advantageously made by the "delayed coking process." The feed to the delayed coking process may preferably be the liquid bottoms product from the distillation of petroleum oil. Such feed may preferably have a boiling point (at 10 mm., 10% over head) in the range of about 550 to 850° F. and an API gravity in the range of about 3 to 12 degrees. The feed is introduced into a heater where it is rapidly brought up to a temperature of about 850 to 950° F., effecting about 30% thermal cracking. The hot effluent from the coking heater is then introduced into the bottom of a coke drum at a temperature in the range of about 850 to 950° F. and a pressure in the range of about 25 to 100 p.s.i.a. As the charge fills the drum, petroleum coke forms, hardens, and falls to the bottom of the coke drum, while the chief product stream of hydrocarbon vapors is removed from the top of the coke drum. The petroleum coke is then cooled with water and removed from the delayed coker by hydraulic jet. Petroleum coke particles are black, hard, and abrasive. Existing plants, in which petroleum coke is produced vary in size from small units producing 75 tons per day to large multiple tower plants producing and handling as much as 1,500 tons of petroleum coke per day.

In the process of this invention, the ratio of sulfonating acid to petroleum coke may vary from about .5 to 7 parts by weight of acid to 1 part by weight of petroleum coke. Reaction temperature during sulfonation may vary from about 150–250° F., and reaction times may vary from about 2 to 24 hours. The sulfur content of untreated petroleum coke may be increased to, for example, 8% by sulfonation. Additional sulfur may be added by resulfonation. It may be shown that the amount of sulfur introduced into petroleum coke by sulfonation bears little relationship to its ion exchange capacity. This may be due to the fact that some of the sulfur combines with the petroleum coke to form complex organic sulfur compounds which do not ionize. This combined sulfur, however, serves as an important secondary element in plant nutrition. In the main sulfonation reaction, sulfo groups i.e.,—$SO_2OH$—become attached to carbon atoms in the petroleum coke. Mixtures of highly complex sulfonic acids whose structures are unknown are thereby formed. The amount and positions taken by the sulfo groups are strongly influenced by such factors as temperature, sulfonating agent, promoter, and concentrations. Concentrated sulfuric acid (96 to 100%), oleums of various strengths (20 to 50%), and spent alkylation acids enriched with oleum may be used as sulfonating agents.

Sulfonation of petroleum coke proceeds satisfactorily without a catalyst or promoter. However, better yields may be obtained by adding a promoter such as 70–72% $HNO_3$, $K_2Cr_2O_7$, $Mn_2(SO_4)_3$, $HgO$, or $HgSO_4$ in the amount of .1–4% by weight of the petroleum coke. As a purification step after sulfonating the petroleum coke sulfonic acid may be washed with successive portions of dilute HCl, e.g., 2.5–20%, deionized or distilled water, or both.

The ion exchange capacity of sulfonated petroleum coke expressed as milliequivalents (meq.) per gram of sulfonated coke is represented by the sum of the strong and weak acid sites. For example, ion exchange capacity may range from about 0.1 to about 4 meq. per gram for strong acid sites and from about 0.05 to about 2 meq. per gram for weak acid sites.

The number of sulfonic groups (strong acid sites) in the sulfonated petroleum coke may be determined by passing 1 N $CaCl_2$ solution over the sulfonated petroleum coke and titrating the filtrate with 0.1 N KOH solution. From the residue, the number of carboxyl groups (weak acid sites) in the sulfonated petroleum coke may be determined. 1 N $(CH_3COO)_2$ Ca solution is passed over the residue and filtrate is titrated with 0.1 N KOH solution.

The cation exchange derivative of sulfonated petroleum coke may be made in one embodiment of the invention by exchanging hydrogen ions in the attached sulfo and carboxyl groups with the desired cations. Each exchanged cation chemically combines in the amount of about .01 to 5% by weight (basis exchanged product). This is preferably accomplished by shaking washed sulfonated petroleum coke with dilute cationic solutions for about one hour at room temperature (about 70° F.). The mixture is then allowed to settle for about 2 to 24 hours and is then filtered. Preferably, the dilute cationic solutions are about .001 to 5 molar solutions of the desired cations in distilled water. To prevent unwanted ions in the product, it is preferred to prepare the dilute cationic exchange solutions from distilled water. However, pure municipal and natural water of low cation content or deionized water may be also used. Treatment with one or more dilute cationic solutions may be necessary to exchange the desired quantity and type of cations.

The cation exchange may be accomplished in an alternate manner by first neutralizing the sulfonated petroleum coke with the oxides, hydroxides, bicarbonates, or carbonates of an alkali metal, alkaline earth metal, or ammonium (for example, sodium or ammonium hydroxide solutions) before treating it with the dilute solutions of the desired cation. For example, neutralizing with ammonium hydroxide, additional nitrogen in the form of ammonia may be added to the sulfonated petroleum coke. The resulting ammoniated product may be also used for controlling the pH of acid soils. Further, it was unexpectedly found that with all other conditions remaining the same, e.g. temperature, time, and concentration, the weight of exchanged cations may be increased about 1–300% by exchanging with the alkali metal salts of sulfonated petroleum coke in comparison with exchanging with the hydrogen ion form of sulfonated petroleum coke.

Cation exchanged derivatives of sulfonated petroleum coke fertilizers do not segregate in storage. A plurality of cation types may be uniformly applied to the soil by successive applications of single cation derivatives of sulfonated petroleum coke. Further, blended mixtures of single cation derivatives of sulfonated petroleum coke may be applied to the soil at one time. Advantageously, derivatives of sulfonated petroleum coke may be applied in one application. Further, single and multi-cation derivatives of sulfonated petroleum coke may be mixed with commercial superphosphate fertilizers and drilled into the soil prior to planting the seed; or they may be applied as top dressing after the seeds are planted. Further, cation derivatives of sulfonated petroleum coke were unexpectedly found to be hydrophilic, permitting them to be sprayed onto the soil as particulate matter in water emulsions of petroleum residua or in water slurries. Herbicides, antinematode agents and other soil chemicals may be incorporated in such sprays.

EXAMPLES

The following examples are offered as a better understanding of the present invention and are not to be construed as unnecessarily limiting thereto.

EXAMPLE I

Petroleum coke, produced from heavy mid-continent crude oil by the "delayed coking process," was ground to 100 mesh or less and dried one hour at a temperature of 200° F. By ultimate analysis, the dried coke contained in percent by weight: sulfur 1.3%, hydrogen 3.9%, nitrogen 1.2%, ash 1.3% and carbon 92.3%. 100 grams of this petroleum coke were heated in a glass flask to a temperature of 200° F. Six hundred grams of 96% $H_2SO_4$ sulfonating agent containing 1 gram of 70–71% $HNO_3$ promoter were added dropwise to the flask over a period of 2 hours while maintaining a temperature of 200–204° F. The flask was cooled to room temperature and held for 24 hours with the acid in contact with the petroleum coke. The contents were then poured into 1500 milliliters of distilled water and the flask was washed free of solids with an additional 500 milliliters of water. After being vacuum filtered and water washed free of sulfate ions, the wet sulfonated petroleum coke was transferred to a percolation column. There it was slowly treated with dilute HCl (about 7.5%) and then washed free of the chloride ion with distilled water.

After being dried at a temperature of about 200° F., the ion exchange capacity of the sulfonated petroleum coke precursor was determined in the following manner. 50 ml. of 1 N $CaCl_2$ solution were added to 0.50 gram of the sulfonated petroleum coke in a flask. The flask was shaken periodically for two hours and the contents filtered. The sulfonated petroleum coke was determined to have strong acid sites in the amount of 0.63 meq. (milliequivalent) per gram of sulfonated petroleum coke by titrating a portion of the filtrate with 0.1 N KOH solution. The filter cake was washed with distilled water and placed in a flask with 50 ml. of 1 N $(CH_3COO)_2$ Ca solution. The contents were stirred periodically, allowed to settle overnight, and filtered. The filtrate was titrated with .1 N KOH solution and the weak acid sites were determined to be 0.32 meq. per gram. The percent by weight of sulfur in the petroleum coke was increased with 1.3% to 6.5% during sulfonation.

Portions of the dry sulfonated petroleum coke precursor were cation exchanged in the following manner. A solution of 1.32 grams of $CoSO_4 \cdot 7H_2O$ in 200 milliliters of distilled water was added to 10 grams of the sulfonated petroleum coke. The mixture was shaken for one hour at room temperature (about 70° F.), allowed to stand 24 hours, and then filtered. The filter cake was washed with several 50 ml. (milliliter) portions of distilled water and dried on a steam plate. 1.38% by weight of cobalt was found in the single cation exchanged derivative of sulfonated petroleum coke product.

In a similar manner, three separate dilute aqueous solutions each comprising 200 ml. of distilled water with respectively 1.18 grams of $CuSO_4 \cdot 5H_2O$, 1.31 grams of $FeSO_4 \cdot 7H_2O$, and 0.52 gram of $NH_4Cl$ were used to treat separate 10 gram portions of the sulfonated petroleum coke precursor. The three separate single cationic derivatives of sulfonated petroleum coke formed respectively contained by weight: copper 1.0%, iron 1.07%, and nitrogen 1.5.%

EXAMPLE II

In this example, except for the sulfonating agent, the sulfonated petroleum coke precursor was made from the same petroleum coke and by the same process as described in Example I. In Example II, the sulfonating agent consisted of 400 grams of fuming sulfuric acid (20–23% $SO_3$). 71–72% $HNO_3$ in the amount of 1% by weight of the petroleum coke was used as a promoter. The sulfonated petroleum coke produced contained 7.44% by weight of sulfur. Its ion exchange capacity was determined to be 1.15 meq. per gram for strong acid sites and 0.45 meq. per gram for weak acid sites. This increase in exchange capacity over that shown in Example I may be attributed to the change in sulfonating agent and concentration.

Three separate portions of dried sulfonated petroleum coke precursor made in accordance with Example II were then cation exchanged with three separate dilute aqueous cationic solutions having the same concentrations of cations and in the same manner as previously described in Example I. Analysis of the three single cationic derivatives of sulfonated petroleum coke produced showed them to have respectively the following in weight percent: Co, 2.11%, Cu, 2.55%, Fe, 1.44%, and N, 1.8%. The 35 to 55% increase in concentration of micronutrient metal ions chemically associated with the sulfonated petroleum coke in Example II in comparison with that of Example I, is largely due to the increased exchange capacity of the precursor employed in Example II.

EXAMPLE III

Petroleum coke produced by the delayed coking process from mixed California Crude Residua is converted to single cationic derivatives of sulfonated petroleum coke by the following continuous process. Petroleum coke is dried in a rotary kiln with hot flue gas to less than 0.1% water and then pulverized to 50–150 mesh. In a rotary kiln at a temperature of 190° F., the pulverized coke is treated with 98% $H_2SO_4$ made by blending used alkylation acid and fresh fuming sulfuric acid. 71–72% nitric acid, in the amount of 1% by weight of the petroleum coke, is added as a promoter. The sulfonating acid is distributed over the petroleum coke as it passes through the first half of the kiln. This is to avoid excessive local temperature. The weight ratio of sulfonating agent to petroleum coke is about 2:1. After two hours in the kiln, the sulfonated petroleum coke is dried with hot flue gas. Portions of the dried sulfonated petroleum coke precursor are then cation exchanged in the manner described in Example 1. Cation derivatives of sulfonated petroleum coke are produced having substantially the same cationic concentrations as the products shown in Example I.

EXAMPLE IV

A multi-cationic derivative of sulfonated petroleum coke was produced by simultaneously ion exchanging sulfonated petroleum coke with three cations in such a ratio as to supply the micronutrient requirements for sugar beet production. Expressed in pounds of nutrient per acre the sugar beet micronutrient requirements are copper 0.06, manganese 1.50, and zinc 0.05.

A solution of multi-cations containing 200 ml. of distilled water, 0.04 gram of $CuSO_4 \cdot 5H_2O$, 0.83 gram of $MnSO_4 \cdot H_2O$, and 0.04 gram of $ZnSO_4 \cdot 7H_2O$ was shaken in a flask at room temperature and at intervals for a total time of 4 hours with 10 grams of sulfonated petroleum coke made from the same materials and by the same process and having the same exchange capacity as described in Example I. After standing overnight, the multi-cation derivative of sulfonated petroleum coke that formed was filtered from the solution, washed with distilled water until free of $SO_4$ ions, and dried. By analysis, it contained the following weight percent of cations: copper 0.08%, manganese 1.47%, and zinc 0.06%. Thus 102 pounds of this multi-cation exchanged derivative of sulfonated petroleum coke when distributed over an acre would supply the micronutrient requirements for growing sugar beets.

EXAMPLE V

The requirements for a particular micronutrient fertilizer expressed as pounds of micronutrient per 100 pounds of fertilizer were magnesium 0.10, iron 0.80, and zinc 0.50. A multi-cation exchanged derivative of sulfonated petroleum coke fertilizer to meet these requirements was made as follows:

200 ml. of a distilled water solution containing 0.20 gram of $MgSO_4 \cdot 7H_2O$, 0.80 gram of $FeSO_4 \cdot 7H_2O$, and 0.44 gram of $ZnSO_4 \cdot 7H_2O$ was shaken in a flask at room temperature and at intervals for a total of 4 hours with 10 grams of sulfonated petroleum coke made from the same raw materials and by the same process as described in Example I. After standing overnight, the metal coke sulfonate was filtered and washed with distilled water until free of $SO_4{-}{-}$ ions. The filter cake was dried on a steam platen for three hours and was found to contain the following weight percent of cations: magnesium 0.17%, iron 0.88% and zinc 0.53%. Approximately 90.5 pounds of multi-cation exchanged derivative of sulfonated petroleum coke of this composition therefor, will supply the required micronutrients.

EXAMPLE VI

Petroleum coke impregnated with copper salts and copper cation exchanged derivative of sulfonated petroleum coke were compared for their resistance to being leached from the soil by rain.

Copper impregnated petroleum coke was prepared as follows: 30–60 mesh powdered petroleum coke was dried at a temperature of 212° F. for 24 hours and then aerated for 6 hours at a temperature of 650° F. After being cooled, 33.4 grams of the aerated petroleum coke were thoroughly mixed with a solution containing 75 ml. of distilled water and 2 grams of $CuSO_4 \cdot 5H_2O$; then, while being slowly stirred, the mixture was evaporated to dryness. By analysis, the impregnated petroleum coke contained 1.08 weight percent of chemically uncombined copper. Leaching experiments were run and the results calculated as inches of rainfall. For example, 294 ml. of distilled water (equivalent to ⅛″ of rainfall) were added to a flask containing the impregnated petroleum coke. The flask was shaken; and, after settling overnight, the contents were filtered. The dried filter cake contained only 0.10% copper—a loss of approximately 90%. Three more water leachings (equivalent to a total rainfall of ½″) reduced the copper content of the petroleum coke to 86 parts per million.

Copper cation exchanged derivative of sulfonated petroleum coke was prepared in the manner described in Example I. Leaching experiments on this material, run in the same manner as described above for the impregnated petroleum coke, showed in comparison substantially no change in copper content of the copper cation exchanged derivative of sulfonated petroleum coke after an equivalent of ⅞ inches of rainfall.

EXAMPLE VII

This example illustrates the process for preparing multi-cation exchanged derivatives of sulfonated petroleum coke by successive applications of dilute aqueous solutions each containing a different cation. Further, it was unexpectedly found that from about 40 to 100 times more cation may be chemically combined with the sulfonated petroleum coke if the exchanged product is not dried between successive ion-exchange steps and the concentration of the solutions was increased.

Part 1

A 10 gram portion of dried sulfonated petroleum coke (exchangeable hydrogen ion form) prepared in the manner described previously in Example I and having substantially the same ion exchange capacity were shaken successively for one-half hour with solutions A, B, and C as shown in Table 1 and in that order. After contact with solution A, the products of the ion exchange were filtered and the filter cake was dried on a steam plate before being contacted with solution B. Similarly, after being contacted with solution B, the products of the ion exchange were filtered and the filter cake dried on a steam plate before being contacted with solution C.

TABLE 1

Solution A—0.08 gram $MnSO_4 \cdot H_2O$ in 100 ml of $H_2O$
Solution B—0.05 gram $CuSO_4 \cdot 5H_2O$ in 50 ml. of $H_2O$
Solution C—0.05 gram $ZnSO_4 \cdot 7H_2O$ in 50 ml. of $H_2O$ The multi-cation exchanged derivative of sulfonated petroleum coke which was produced was then washed with 200 ml. of distilled water. Analysis showed the following chemically combined cations in weight percent: manganese about 0.005%, copper 0.001%, and zinc 0.002%.

Part 2

Another 10 grams of dried sulfonated petroleum coke as described in Part 1 were treated successively in three stages with solutions D, E and F, as shown in Table 2, in that order. The manner of treatment was the same as described previously in Part 1; however, the product of the cation exchange was not dried between successive stages.

TABLE 2

Solution D—0.1 gram $ZnSO_4 \cdot 7H_2O$ in 70 ml. $H_2O$
Solution E—0.7 gram $MnSO_4 \cdot H_2O$ in 70 ml. $H_2O$
Solution F—0.15 gram $CuSO_4 \cdot 5H_2O$ in 50 ml. $H_2O$ Analysis of the washed multi-cation exchanged derivative of sulfonated petroleum coke product showed the following chemically combined cations in weight percent: Zinc 0.075%, magnesium 0.43% and copper 0.11%.

EXAMPLE VIII

This example illustrates the preparation of single cation exchanged derivatives of sulfonated petroleum coke from the alkali metal salts thereof. Further, it was unexpectedly found that more cations may be exchanged with an alkali metal salt of sulfonated petroleum coke (e.g. exchangeable sodium ion form) than may be exchanged with sulfonated petroleum coke (exchangeable hydrogen ion form).

Part 1

20 grams of sulfonated petroleum coke precursor prepared in the manner described previously in Example I and having substantially the same ion exchange capacity were treated successively with two 100 ml. solutions each containing 0.8 gram of sodium hydroxide. The alkali metal salt of sulfonated petroleum coke formed by sodium ion replacing hydrogen ions was washed with five 100 ml. portions of deionized water and dried on a steam plate. Analysis of the product showed 2.59 weight percent of exchanged sodium.

Three separate 5 gram portions of said sodium salt of sulfonated petroleum coke were shaken with a different dilute solution each containing 100 ml. of distilled water and a cation containing compound as shown in column 2 of Table 3. The cation exchanged derivative of sulfonated petroleum coke thereby formed was filtered, washed with five 50 ml. portions of water, dried on a steam plate, and analyzed. The amount of exchanged cation in the product is shown in column 3 of Table 3.

Part 2

For comparison, Part 1 was rerun with the same dilute cationic solutions but with three separate 5 gram portions of unreacted sulfonated petroleum coke, i.e. containing exchangeable hydrogen ions. The amount of exchanged cation in the product in weight percent is shown in column 4 of Table 3. It represents about ⅕ to ¼ less cation than the weight of exchanged cation in the product obtained in Part 1, where the $Na^+$ form of sulfonated petroleum coke was exchanged.

TABLE 3

| Exchanged cation | Dilute cationic solution (100 ml of deionized $H_2O$) | Exchanged cation (weight percent) | |
|---|---|---|---|
| | | Part 1 [a] | Part 2 [b] |
| Cobalt | 0.625 grams $CoSO_4 \cdot 7H_2O$ | 0.98 | 0.78 |
| Copper | 0.50 grams $CuSO_4 \cdot 5H_2O$ | 1.47 | 1.10 |
| Zinc | 0.50 grams $ZnCl_2$ (anhydrous) | 1.41 | 1.15 |

[a] $Na^+$ form of sulfonated petroleum coke.
[b] $H^+$ form of sulfonated petroleum coke.

EXAMPLE IX

This example illustrates the preparation of multi-cation exchanged derivatives of sulfonated petroleum coke by loading both the hydrogen ion and the sodium ion forms of sulfonated petroleum coke with various cations by means of successive applications of dilute cationic solutions.

Part 1

A 10-gram portion of sulfonated petroleum coke (exchangeable hydrogen ion form) prepared in the manner described previously in Example I and having substantially the same ion exchange capacity was shaken for 24 hours at room temperature with a solution containing 70 ml. of deionized water and 0.100 gram of $ZnSO_4 \cdot 7H_2O$. The solution was filtered off, and the undried filter cake was shaken for 24 hours at room temperature with a second solution containing 70 ml. of deionized water and 0.70 gram of $MnSO_4 \cdot H_2O$. The solution was filtered off, and the undried filter cake was shaken 24 hours with a third solution containing 50 ml. of deionized water and 0.150 gram of $CuSO_4 \cdot 5H_2O$. The solution was filtered off and the filter cake consisting of the multi-cation exchanged derivative of sulfonated petroleum coke product was washed with four 50 ml. portions of distilled water and dried on a steam plate.

An analysis of the multi-cationic product is shown in column 2 of Table 4.

Part 2

A 10-gram portion of the sodium salt of sulfonated petroleum coke as prepared in Example VIII Part 1 was subjected to the same cationic exchange with the same solutions as described in Part 1. An analysis of the multi-cationic product is shown in column 3 of Table 4. It was unexpectedly found that the weight of each cation exchanged increased more than 100% by using the exchangeable sodium ion form of sulfonated petroleum coke in comparison with the exchangeable hydrogen ion form.

TABLE 4

| Exchanged cation | Exchanged cation (weight percent) | |
|---|---|---|
| | Part 1 [a] | Part 2 [b] |
| Manganese | 0.66 | 1.67 |
| Zinc | 0.074 | 0.16 |
| Copper | 0.14 | 0.28 |

[a] H+ form of sulfonated petroleum coke.
[b] Na+ form of sulfonated petroleum coke.

The process of the invention has been described generally and by examples with reference to single and multi-cation derivatives of sulfonated petroleum coke of particular compositions for purposes of clarity and illustration only. It will be apparent to those skilled in the art from the foregoing that various modifications of the process and products disclosed herein can be used to prepare other micronutrient fertilizers and ion-exchange materials of similar compositions, without departure from the spirit of the invention.

We claim:
1. A process for producing a cation exchanged derivative of sulfonated petroleum coke useful as micronutrient fertilizer, soil conditioner, or ion exchange material comprising the steps of:
 (a) contacting one part by weight of finely divided petroleum coke with about 0.5 to 7 parts by weight of a sulfonating agent at a temperature in the range of about 150 to 250° F. to produce water-insoluble sulfonated petroleum coke;
 (b) washing said sulfonated petroleum coke until substantially free of sulfate ions; and
 (c) contacting said washed sulfonated petroleum coke or the alkali metal salt thereof with at least one dilute aqueous solution containing at least one cation from the group of cations consisting of copper, iron, magnesium, molybdenum, manganese, zinc, cobalt, ammonium, and mixtures thereof to effect ion exchange and to produce said cation exchanged derivative of sulfonated petroleum coke or the alkali metal salt thereof, having a sufficient cation content to function as said micronutrient fertilizer, soil conditioner, or ion exchange material.

2. The process of claim 1 wherein the concentration of each cation in the dilute aqueous solutions of (c) is in the range of about 0.001 to 5 moles per liter and each exchanged cation is chemically combined in said cation exchanged derivative of sulfonated petroleum coke in the amount of about 0.01 to 5 percent by weight.

3. A process for producing as a micronutrient fertilizer, soil conditioner, or ion exchange material a cation exchanged derivative of sulfonated petroleum coke comprising the steps of:
 (a) heating the liquid bottoms product from the distillation of petroleum oil to a temperature in the range of about 850 to 950° F. and introducing same into a coking zone where petroleum coke forms;
 (b) contacting one part by weight of finely divided petroleum coke from (a) with about 0.5 to 7 parts by weight of a sulfonating agent at a temperature in the range of about 150 to 250° F. to produce water-insoluble sulfonated petroleum coke;
 (c) washing said sulfonated petroleum coke until substantially free of sulfate ions; and
 (d) contacting said washed sulfonated petroleum coke or the alkali metal salt thereof with at least one dilute aqueous solution containing at least one cation from the group of cations consisting of copper, iron, magnesium, molybdenum, manganese, zinc, cobalt, ammonium, and mixtures thereof, with the concentrations of each cation in solution being about 0.001 to 5 moles per liter, thereby producing said cation exchanged derivative of sulfonated petroleum coke or the alkali metal salt thereof.

4. A cation exchanged derivative of sulfonated petroleum coke or the alkali metal salt thereof, as produced by the process of claim 3.

5. A multi-cation derivative of sulfonated petroleum coke or the alkali metal salt thereof, as produced by the process of claim 3.

6. The process of claim 3 wherein the sulfonating agent in (b) is selected from the group consisting of 96 to 100% sulfuric acid, 20 to 50% oleum, and spent alkylation acid enriched with oleum.

7. The process of claim 6 with the addition of 0.1 to 4 weight percent based on the weight of the petroleum coke, of a promoter during sulfonating step (b), said promoter being selected from the group consisting of 70–72% $HNO_3$, $K_2Cr_2O_7$, $Mn(SO_4)_3$, $HgO$, and $HgSO_4$.

References Cited
UNITED STATES PATENTS 2,471,213   5/1949   Higgins _____ 71—1
3,082,074   3/1963   Handley et al. _____ 71—1

OTHER REFERENCES

Groggins—"Unit Processes In Organic Synthesis," 4th edition, 1952—pages 268, 307, 310, 311—published by McGraw-Hill Book Co., Inc., New York—copy in group 126—(QD 262 G7 1952 c.3).

SAMIH N. ZAHARNA, Primary Examiner
B. H. LEVENSON, Assistant Examiner

U.S. Cl. X.R.
47—9, 71—64F